(12) United States Patent
Fujii

(10) Patent No.: US 11,403,053 B2
(45) Date of Patent: Aug. 2, 2022

(54) DUPLICATION PROCESSING APPARATUS, DUPLICATION PROCESSING SYSTEM, AND NON-TRANSITORY COMPUTER READABLE MEDIUM

(71) Applicant: FUJIFILM BUSINESS INNOVATION CORP., Tokyo (JP)

(72) Inventor: Masaru Fujii, Kanagawa (JP)

(73) Assignee: FUJIFILM Business Innovation Corp., Tokyo (JP)

(\*) Notice: Subject to any disclaimer, the term of this patent is extended or adjusted under 35 U.S.C. 154(b) by 339 days.

(21) Appl. No.: 16/212,974

(22) Filed: Dec. 7, 2018

(65) Prior Publication Data
US 2019/0265920 A1 Aug. 29, 2019

(30) Foreign Application Priority Data
Feb. 27, 2018 (JP) .............................. JP2018-033396

(51) Int. Cl.
*G06F 3/12* (2006.01)
(52) U.S. Cl.
CPC .......... *G06F 3/1231* (2013.01); *G06F 3/1204* (2013.01); *G06F 3/1288* (2013.01); *G06F 3/1285* (2013.01)
(58) Field of Classification Search
CPC .... G06F 3/1231; G06F 3/1288; G06F 3/1204; G06F 3/1285; H04L 41/0846; H04N 1/00938; H04N 1/00962; H04N 1/0097; H04N 1/00973

USPC ......................................... 358/1.15; 258/1.15
See application file for complete search history.

(56) References Cited

U.S. PATENT DOCUMENTS

| | | | | |
|---|---|---|---|---|
| 2012/0268783 | A1* | 10/2012 | Nakahara | G06F 3/1232 358/1.15 |
| 2015/0012613 | A1* | 1/2015 | Wang | H04L 67/06 709/217 |
| 2017/0316112 | A1* | 11/2017 | Qian | G06F 16/90348 |
| 2020/0310394 | A1* | 10/2020 | Wouhaybi | H04L 69/40 |

FOREIGN PATENT DOCUMENTS

| | | |
|---|---|---|
| JP | 2015-153350 A | 8/2015 |
| JP | 2015-176480 A | 10/2015 |
| JP | 5939742 B2 | 6/2016 |

\* cited by examiner

*Primary Examiner* — Darryl V Dottin
(74) *Attorney, Agent, or Firm* — Oliff PLC

(57) ABSTRACT

There is provided a duplication processing apparatus includes: an extraction unit configured to, when a setting duplication request is received from a first information processing apparatus, extract a setting to be duplicated to the first information processing apparatus based on a configuration and a setting of the first information processing apparatus and a configuration and a setting of a second information processing apparatus which is different from the first information processing apparatus; and a transmitter configured to transmit the setting extracted by the extraction unit to the first information processing apparatus.

13 Claims, 15 Drawing Sheets

FIG.6

| 605 | 610 | 615 | 620 | 625 | 600 |
|---|---|---|---|---|---|
| LOG ID | LOG TYPE | DATE AND TIME | OPERATOR | OPERATION CONTENTS | ... |
| | | | | | |
| | | | | | |

FIG.10

| TARGET INFORMATION PROCESSING APPARATUS | CONFIGURATION INFORMATION 1010 | | ... | SETTING INFORMATION 1030 | | ... | LOG INFORMATION 1055 | | ... |
|---|---|---|---|---|---|---|---|---|---|
| 1005 | MODEL NAME 1015 | CPFS CAPABILITY (INCLUDING OPTIONS) 1020 | | ADD-ON APPLICATION PRESENCE/ABSENCE 1040 | | | JOB LOG 1060 | | |
| | | | | Scan Auto 1035 | Private Print 1025 | | NUMBER OF JOB EXECUTION 1050 | | |
| | | | | | | | SCAN 1045 | PRINT 1065 | |
| DEVICE X | DMP-XI-3a | C, P, F, S | ... | ○ PRESENCE | ○ PRESENCE | ... | 0 | 0 | ... |
| ANOTHER DEVICE A | DMP-XI-1cPI | C, P, F, S | ... | X ABSENCE | X ABSENCE | ... | 770 | 329 | ... |
| ANOTHER DEVICE B | DMP-XI-3a | C, P, S | ... | ○ PRESENCE | ○ PRESENCE | ... | 480 | 424 | ... |
| ... | ... | ... | ... | ... | ... | ... | ... | ... | ... |
| ANOTHER DEVICE Z | DMP-XI-1d | C, P, S | ... | ○ PRESENCE | X ABSENCE | ... | 1021 | 81 | ... |

1000, 1070

DUPLICATION PROCESSING APPARATUS, DUPLICATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-033396 filed Feb. 27, 2018.

BACKGROUND

(i) Technical Field

The present invention relates to a duplication processing apparatus, a duplication processing system, and a non-transitory computer readable medium.

(ii) Related Art

JP-A-2015-153350 discloses a technology that provides an image forming apparatus capable of importing even a function which is not yet validated in the own apparatus when a setting item does not affect another setting item when setting information is imported. A dependency table storage unit of the image forming apparatus stores data that defines whether one setting item included in the setting information of the own apparatus affects another setting item, as a dependency between the setting items. An import level determining unit compares the identification information of the own apparatus with the identification information of the other apparatus, and determines the import level at the time of reflecting the setting information of the other apparatus in the setting information of the own apparatus based on the result. A setting item reflection unit reflects the setting information of the other apparatus in the setting information of the own apparatus according to the determined import level.

JP-A-2015-176480 discloses a technology that proposes preventing the omission of important address information when an address book having a large number of address information entries is delivered to an address book of another device having a small number of address information entries. A first processing apparatus exports the address book to a server device. Then, the server device sets a priority for each type tag of the address information registered in the address book, sequentially selects the address information for which the type tag is set in the order in accordance with the priority, and generates the address book in which the address information is recorded in the selected order. Thereafter, the server device imports this address book into the address book of a second processing apparatus so that the address information with high priority is not missing in the address book even when the number of address information entries in the address book is smaller than that in the address book.

JP-B-5939742 provides an image forming apparatus which controls multiple applications. The image forming apparatus includes: a saving unit that saves setting information input from a connected device in a temporary area; an acquisition unit that acquires device identification information including at least a machine type management number and a machine body management number from the setting information saved in the temporary area; a determination unit that determines different importing levels, from three importing levels, for the following respective cases: (1) a case where the machine type management number and the machine body management number that are included in the device identification information acquired by the acquisition unit match the machine type management number and the machine body management number of the own apparatus, (2) a case where the machine type management number included in the device identification information acquired by the acquisition unit matches the machine type management number of the own apparatus, and the machine body management number included in the device identification information does not match the machine body management number of the own apparatus, and (3) a case where the machine type management number included in the device identification information acquired by the acquisition unit do not match the machine type management number of the own apparatus, as the result of the comparison between the device identification information acquired by the acquisition unit and the machine type management number and the machine body management number of the own apparatus; an extraction unit that extracts one or more setting values to be reflected in the own apparatus from the setting information according to the determined importing levels and attributes corresponding to multiple setting values, respectively, included in the setting information saved in the temporary area; and a storage unit that stores the one or more setting values extracted by the extraction unit in a storage to be used for a control in each application. As for the attributes corresponding to the setting values, the following four attributes exist: (a) an object not to be imported; (b) importing is possible only when the machine type management number and the machine body management number that are included in the device identification information acquired by the acquisition unit match the machine type management number and the machine body management number of the own apparatus; (c) importing is also possible when the machine type management number included in the device identification information acquired by the acquisition unit matches the machine type management number of the own apparatus, and the machine body management information included in the device identification information does not match the machine body management number of the own apparatus; and (d) importing is also possible when the machine type management number included in the device identification information acquired by the acquisition unit does not match the machine type management number of the own apparatus. The extraction unit extracts a setting value corresponding to an attribute indicating an importable setting value in the importing levels determined by the determination unit.

SUMMARY

For example, a user sets an application in an information processing apparatus and he/she may want to set the same application in another information processing apparatus. In order to reduce the effort of setting the application in the other information processing apparatus again, a setting synchronization method using a duplication process (also referred to as cloning) has been used in the related art.

However, setting items are different depending on the configuration such as hardware options of the information processing apparatus. As a result, the duplication process is performed even for setting items that are not currently used. Therefore, extra storage space is required for the unused setting items.

Aspects of non-limiting embodiments of the present disclosure relate to providing a duplication processing apparatus and a non-transitory computer readable medium capable of duplicating settings while preventing consumption of extra storage space when the configuration of the information processing apparatus is changed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a duplication processing apparatus includes: an extraction unit configured to, when a setting duplication request is received from a first information processing apparatus, extract a setting to be duplicated to the first information processing apparatus based on a configuration and a setting of the first information processing apparatus and a configuration and a setting of a second information processing apparatus which is different from the first information processing apparatus; and a transmitter configured to transmit the setting extracted by the extraction unit to the first information processing apparatus.

BRIEF DESCRIPTION OF THE DRAWINGS

Exemplary embodiment(s) of the present invention will be described in detail based on the following figures, wherein:

FIG. 6 is an explanatory view illustrating an example of a data structure of a log information table;

FIG. 10 is an explanatory view illustrating an example of a data structure of a configuration/setting/log information table;

DETAILED DESCRIPTION

Hereinafter, exemplary embodiments of the present invention will be described with reference to the accompanying drawings.

Figure 1:
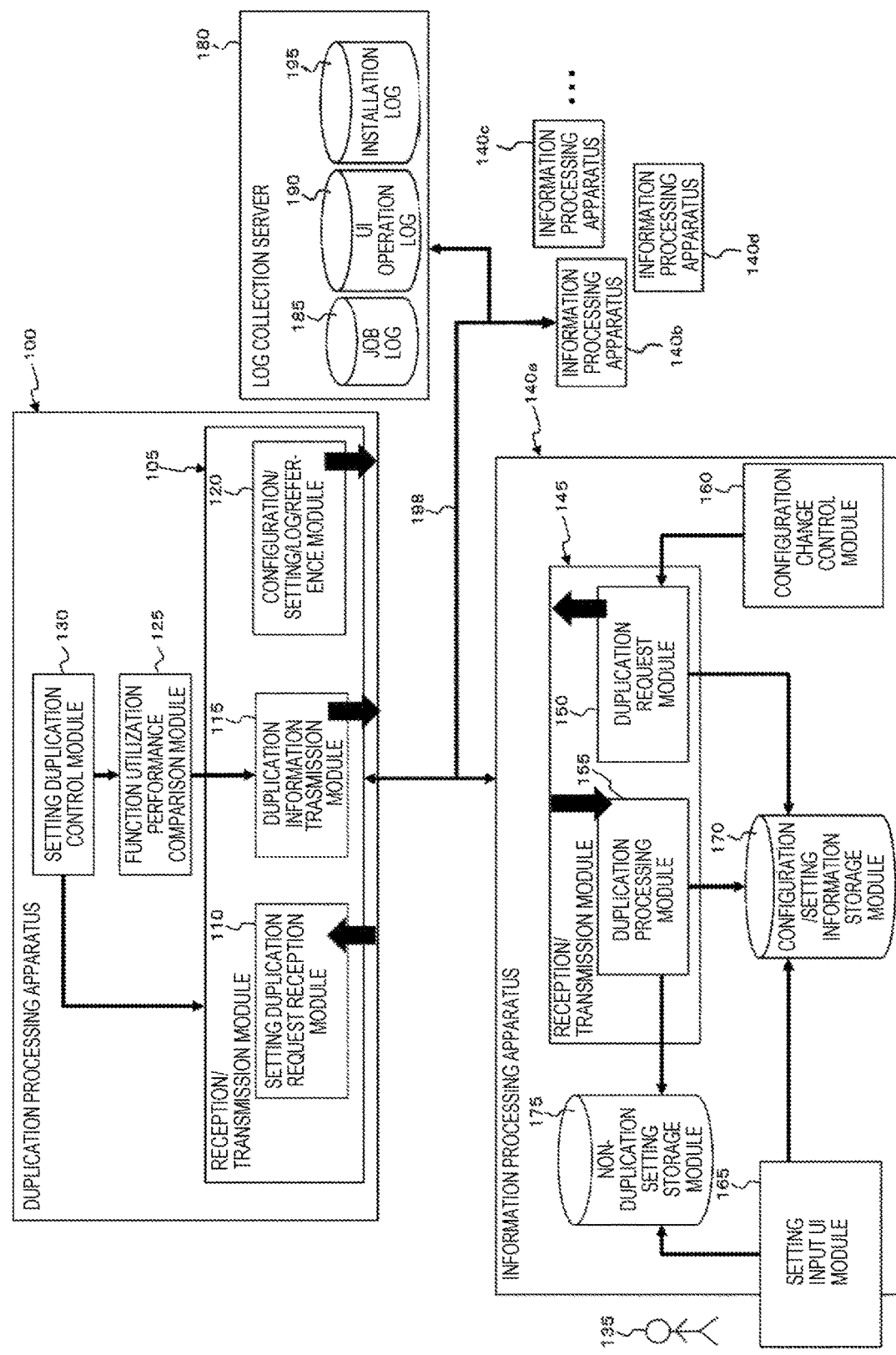
FIG. 1 is a conceptual module configuration diagram of a configuration example according to an exemplary embodiment.

FIG. 1 illustrates a conceptual module configuration diagram of a configuration example according to an exemplary embodiment.

As used herein, the term "module" generally refers to a component such as software (computer program), hardware or the like that may be logically separated. Therefore, a module in this exemplary embodiment refers to not only a module for a computer program but also a module for a hardware configuration. Therefore, in this exemplary embodiment, a computer program that causes a computer to function as a module (a program that causes a computer to execute each procedure, a program that causes a computer to function as each unit, and a program that causes a computer to implement each function), a system and a method will be described. As used herein, the terms "store", "cause (something) to store" and an equivalent wording refer to storing a computer program in a storage device or perform a control to store a computer program in a storage device. In addition, modules may be in a one-to-one correspondence with functions. In implementation, one module may be implemented by one program, or plural modules may be implemented by one program, or conversely, one module may be implemented by plural programs. Further, plural modules may be executed by one computer, or one module may be executed by plural computers in a distributed or parallel environment. Further, one module may include another module. As used herein, the term "connection" is intended to include not only a physical connection but also a logical connection (data exchange, instruction, reference relation between data, etc.). As used herein, the term "predetermined" refers to that an object is determined before a targeted process. Specifically, the term "predetermined" indicates that an object is determined not only before a process according to the present exemplary embodiment starts, but also before a targeted process even after the process according to the present exemplary embodiment starts, according to the situation/state at that time or according to the situation/state until that time. When there are plural "predetermined values", they may be different values or may be more than two identical values (of course, all of the plural predetermined values may be identical to each other). In addition, a phrase "when A is true, do B" is used to mean "to determine whether A is true and when A is true, do B", except for cases where it is unnecessary to determine whether A is true. Further, when enumerating objects like "A, B, C", or the like, it is an example enumeration unless otherwise mentioned, including a case where only one of them is selected (e.g., only A).

The term "system or apparatus" is implemented not only by plural computers, hardware, devices, or the like, which are connected by a communication unit such as a network (including a one-to-one correspondence communication connection), but also by a single computer, single hardware, a single device or the like. Herein, the "apparatus" and the "system" are used synonymously with each other. The "system" does not include things that are merely a social "structure" which is an artificial agreement (social system).

In addition, for each process by each module or for each process when plural processes are performed in the module, target information is read from a storage device, the process is performed and then, a result of process is written in the storage device. Therefore, the description about reading from the storage device before processing and writing to the storage device after the processing may be omitted. The storage device used here may include a hard disk, a random access memory (RAM), an external storage medium, a storage device via a communication line, a register in a central processing unit (CPU), and the like.

A duplication processing apparatus 100 according to the present exemplary embodiment has a function as a duplication manager (a cloud or a server), that is, a function of managing (or executing) a duplication process between information processing apparatuses 140 (hereinafter, also referred to as cloning). The duplication processing apparatus 100 includes a reception/transmission module 105, a function utilization performance comparison module 125, and a setting duplication control module 130 as illustrated in the example of FIG. 1. The duplication processing apparatus 100 is connected to the plural information processing apparatuses 140 and a log collection server 180 via a communication line 198.

When a configuration of an information processing apparatus 140 (also referred to as a device) is changed, the duplication processing apparatus 100 duplicates data in another information processing apparatus 140 (including an application program, setting information, and the like).

When receiving a setting duplication request from a first information processing apparatus (for example, an information processing apparatus 140a), the duplication processing apparatus 100 performs a control to duplicate a setting of a second information processing apparatus having the setting suitable for the first information processing apparatus (the second information processing apparatus is an information processing apparatus other than the first information processing apparatus, for example, an information processing apparatus 140b or the like).

Further, the information processing apparatus 140 is a device to be duplicated (an information processing apparatus 140 requesting duplication or an information processing apparatus 140 having data to be duplicated). Examples of the information processing apparatus 140 include a personal computer, a portable terminal device, and an image processing apparatus. In the following description, an image processing apparatus will be used as an example.

In the present exemplary embodiment, for example, the following process is performed. In particular, this description (description in this paragraph) is intended to facilitate understanding of the present exemplary embodiment, and is not intended to limit an interpretation using this explanation. Further, a determination as to whether the invention sought to be patented is described in the detailed description of the invention (Article 36(6)(i) of the Japanese Patent Act) should not be made only based on this description portion.

When a setting of an application is performed on a certain device and it is desired to use the setting of the application on another device, a setting synchronization technique by a cloning (duplication process) has been used in the related art in order to reduce an operator's effort (maintenance staff's effort) for performing the setting again (performing a setting on a first device and performing a setting on a second device).

In general, the cloning technique is performed as follows: (1) setting information of an own apparatus is stored (overwritten) in another apparatus as it is based on a user's instruction or a system's instruction, and (2) the user backs up data such as a settings to a central processing unit once at an arbitrary timing, and then restores the data backed up to any device at any timing.

However, when devices are different from each other in configuration such as hardware options, an application or a setting thereof may not be targeted for cloning. Further, even when cloning is performed, cloning occurs again after the configurations of the hardware options or the like matches.

For a setting which is to be required in future after a configuration of a device is changed, the technique disclosed in JP-A-2015-153350 includes a unit that clones settings including a setting group that is not currently being used.

By applying this unit, it is possible to eliminate for the operator to perform a cloning operation again.

However, the application of the above-described unit is not desirable in the following cases, and becomes a problem in terms of practicality. That is, it is a unit that depends on a future prediction to be performed at a time before the configuration change is made, and it is not possible to predict or absorb the influence due to an unanticipated sudden change in configuration.

<Case 1>

A storage area for the setting is consumed more than necessary until the configuration is changed. For example, various settings relating to an external device are stored in a setting area or a primary storage area in order to prepare for connection of the external device. However, until the external device is connected, it is not used (that is, it is wasted) and is not preferable from the viewpoint of resource utilization rate.

<Case 2>

Until the configuration is changed, a setting action itself may not be permitted. For example, until the external device is connected, a safety device operates and the setting action itself cannot be performed, or a setting destination object is not yet in an available state (so-called undeployed state).

<Case 3>

In addition, it is a practical matter up to which version of the hardware option the above-mentioned unit clones the setting information. For example, the cloning data including data of an old version (for example, Ver1) may not be valid when an external device of a new version (for example, Ver3) is connected. That is, in setting information of a target hardware option, obsolescence occurs due to forward compatibility.

<Case 4>

When cloning is performed directly between devices without using a central processing unit or the like, and it is not possible to communicate properly with a device requesting cloning (when an appropriate device is powered off, or when there is no suitable device in a communicable range), the cloning process may not be performed.

When the duplication processing apparatus 100 receives a duplication request from an apparatus (the information processing apparatus 140a), the duplication processing apparatus 100 determines a setting to be duplicated based on the configuration and setting of the apparatus group included in the duplication processing apparatus 100 in response to the request as a trigger and executes cloning for the apparatus that has requested cloning. That is, cloning is performed based on a situation at a time when the setting update has been made rather than using a unit that relies on future prediction. This makes it possible to cope with the above-mentioned four cases, and implement cloning that flexibly copes with a sudden change of configuration. Particularly, when a communication with the duplication processing apparatus 100 is possible, it is possible to perform cloning without depending on turning on/off of another apparatus (power supply state) or the communication state with other apparatus. Also, in an office environment in which a cloud connection is possible, it is easy to set up a device connected to the duplication processing apparatus 100.

The reception/transmission module 105 includes a setting duplication request reception module 110, a duplication information transmission module 115, and a configuration/setting/log/reference module 120. The reception/transmission module 105 is connected to a setting duplication control module 130. The reception/transmission module 105 is also connected to a reception/transmission module 145 of the information processing apparatus 140a, the information processing apparatus 140b, an information processing apparatus 140c, and an information processing apparatus 140d via the communication line 198. The reception/transmission module 105 communicates with the information processing apparatuses 140 and the log collection server 180. For example, the reception/transmission module 105 performs processes such as receiving a configuration and a setting of an information processing apparatus 140 from the information processing apparatus 140, receiving various types of log information from the log collection server 180 in order to determine a setting to be duplicated, and receiving a duplication request and transmitting a setting in response to the duplication request.

The setting duplication request reception module 110 receives a setting duplication request from the first information processing apparatus.

The duplication information transmission module 115 is connected to the function utilization performance comparison module 125. The duplication information transmission module 115 transmits a setting extracted by the setting duplication control module 130 to the first information processing apparatus in response to the duplication request.

The configuration/setting/log/reference module 120 receives the configuration and the setting from each information processing apparatus 140. For example, the configuration and the setting may be received from each information processing apparatus 140 at a predetermined date and time (year, month, and day (including a day of a week), hour, minute, second, second or less, or a combination thereof). Here, the transmission date and time may be determined for each information processing apparatus 140. Further, the configuration/setting/log/reference module 120 acquires job history information of each information processing apparatus 140 (processing history information of the information processing apparatus 140), user interface history information, and installation history information (hereinafter, these log information may be collectively referred to as "various types of log information") from the log collection server 180.

The function utilization performance comparison module 125 is connected to the duplication information transmission module 115 of the reception/transmission module 105 and the setting duplication control module 130. In accordance with an instruction by the setting duplication control module 130, the function utilization performance comparison module 125 compares a function (configuration) and the utilization performance information (various types of log information) between a first information processing apparatus which has made a duplication request (the information processing apparatus 140a) and another information processing apparatus 140, and selects a second information processing apparatus (the information processing apparatus 140b or the like) having a setting to be duplicated to the information processing apparatus 140 which has made the duplication request. For example, the information processing apparatus 140 which has the configuration and utilization performance most similar to those of the first information processing apparatus may be selected as the second information processing apparatus. Then, a setting of the selected second information processing apparatus is duplicated to the first information processing apparatus that has made the duplication request.

The setting duplication control module 130 is connected to the reception/transmission module 105 and the function utilization performance comparison module 125. The setting duplication control module 130 extracts the setting to be duplicated to the first information processing apparatus based on the configuration and the setting of the first information processing apparatus and the configuration and the setting of the second information processing apparatus (the processing result by the function utilization performance comparison module 125).

The setting duplication control module 130 may select the second information processing apparatus which is a duplication source in accordance with a predetermined selection condition and extract the setting of the second information processing apparatus.

Here, the "selection condition" may include a condition that the second information processing apparatus has the configuration, the setting, and history which are similar to the configuration, the setting, and history of the first information processing apparatus, respectively.

The "selection condition" may include a setting not to be duplicated.

The "selection condition" may include a priority. In this case, the setting duplication control module 130 may extract the setting in accordance with the priority.

Further, when the setting duplication control module 130 cannot extract a setting, the setting duplication control module 130 may extract a setting according to a next priority. That is, when a setting in a higher priority cannot be extracted, a setting in the next priority is extracted.

In addition, when the setting duplication control module 130 cannot refer to at least one of the configuration, setting, or history of the first information processing apparatus, the setting duplication control module 130 may exclude the at least one of the configuration, setting, or history of the first information processing apparatus information and select a second information processing apparatus which is a duplication source.

Also, the setting duplication control module 130 may extract a predetermined setting for the first information processing apparatus. Here, the "predetermined setting for the first information processing apparatus" corresponds to, for example, a setting such as prohibition of color copying when the first information processing apparatus belongs to a group.

Also, the setting duplication control module 130 may refer to the history and when the use frequency of the predetermined configuration is small, the setting duplication control module 130 may not to extract a setting of the predetermined configuration.

The information processing apparatus 140a is an example of the first information processing apparatus. The information processing apparatus 140a includes a reception/transmission module 145, a configuration change control module 160, a setting input UI module 165, a configuration/setting information storage module 170, and a non-duplication setting storage module 175. The information processing apparatus 140b and the like are connected to the reception/transmission module 105 of the duplication processing apparatus 100 and the log collection server 180 via the communication line 198. The information processing apparatus 140b and the like (which are the information processing apparatuses 140 other than the information processing apparatus 140a, and are the information processing apparatus 140*b*, the information processing apparatus 140*c*, and the information processing apparatus 140*d* in the example of FIG. 1) also have the module configurations which are equivalent to that of the information processing apparatus 140*a*. However, the information processing apparatus 140*b* and the like are examples of a device that may be the second information processing apparatus. The information processing apparatus 140*b* and the like transmit the configuration and the setting of the information processing apparatus 140*b* and the like to the duplication processing apparatus 100, and transmit various types of log information to the log collection server 180. Therefore, since the duplication processing apparatus 100 stores the configuration and the setting of the information processing apparatus 140*b* and the like in advance (before the duplication request is made), when receiving the duplication request from the information processing apparatus 140*a*, the duplication processing apparatus 100 does not need to be in a communicable state with the information processing apparatus 140*b* and the like. That is, when the duplication processing apparatus 100 is able to communicate with the information processing apparatus 140*a*, the information processing apparatus 140*a* (or the duplication processing apparatus 100) may be in a state where communication may not be made with the information processing apparatus 140*b* and the like which have the setting to be duplicated.

The reception/transmission module 145 has a duplication request module 150 and a duplication processing module 155. The reception/transmission module 145 is connected to the reception/transmission module 105 of the duplication processing apparatus 100 via the communication line 198. The reception/transmission module 145 communicates with the duplication processing apparatus 100, the other information processing apparatus 140, and the log collection server 180. In addition to the communication process by the duplication request module 150 and the duplication processing module 155, the reception/transmission module 145 transmits the configuration and the setting of the information processing apparatus 140*a* to the duplication processing apparatus 100 and transmits the various types of log information to the log collection server 180.

The duplication request module 150 is connected to the configuration change control module 160. When an event for changing the configuration of the information processing apparatus 140*a* occurs (when the configuration change control module 160 detects a configuration change), the duplication request module 150 transmits a setting duplication request to the duplication processing apparatus 100.

The duplication processing module 155 is connected to the configuration/setting information storage module 170 and the non-duplication setting storage module 175. The duplication processing module 155 receives the setting from the duplication processing apparatus 100, as a response to the duplication request by the duplication request module 150. Then, the duplication processing module 155 duplicates the setting to the information processing apparatus 140*a*. Specifically, the duplication processing module 155 stores the setting in the configuration/setting information storage module 170.

The configuration change control module 160 is connected to the duplication request module 150 of the reception/transmission module 145. The configuration change control module 160 detects an occurrence of an event for changing the configuration of the information processing apparatus 140*a* and notifies the duplication request module 150 of the occurrence of the event. This event includes, for example, a first startup (first startup after installing the information processing apparatus 140*a*), a pre-installation, a firmware update, and an installation of an application (program).

The setting input UI module 165 is connected to the configuration/setting information storage module 170 and the non-duplication setting storage module 175. The setting input UI module 165 controls, for example, a liquid crystal display serving as a touch panel, to receive a user's operation and present a message to the user. In addition, the setting input UI module 165 may receive a user's operation using a mouse, a keyboard, a camera, a microphone, or the like (including a glance, a gesture, voice, and the like), or may present a message to the user by an audio output by a speaker and a tactile sense using a tactile device.

For example, when a setting not suitable for duplication (which may be a setting requiring determination by the user) exists, the setting input UI module 165 notifies a user 135 of the setting. Here, examples of the "setting not suitable for duplication" include a setting of a confidential box (a folder which only a predetermined user is accessible, the folder storing a scanned image or a facsimile received image), an output setting of a full color machine in a case where the information processing apparatus 140 requesting duplication is a black and white machine, a setting of an IP address, a setting of a domain name, and an administrator account.

The configuration/setting information storage module 170 is connected to the duplication request module 150 and the duplication processing module 155 of the reception/transmission module 145, and the setting input UI module 165. The configuration/setting information storage module 170 stores the configuration and the setting of the information processing apparatus 140*a*. Examples of the configuration include, for example, an OS (type, version, etc.), an application, and an external device (hardware option) of the information processing apparatus 140*a* such as a finisher and an IC card reader.

The non-duplication setting storage module 175 is connected to the duplication processing module 155 of the reception/transmission module 145 and the setting input UI module 165. The non-duplication setting storage module 175 stores settings that are not to be duplicated. For example, a setting of address book information and the like are not to be duplicated for security reasons.

The log collection server 180 stores a job log 185, a UI operation log 190, and an installation log 195. The log collection server 180 is connected to the information processing apparatus 140*a*, the information processing apparatus 140*b*, the information processing apparatus 140*c*, and the information processing apparatus 140*d* via the communication line 198. The log collection server 180 stores the various types of log information of the respective information processing apparatuses 140 (the information processing apparatus 140*a*, the information processing apparatus 140*b*, and the like). The function of the log collection server 180 may be provided in the duplication processing apparatus 100 (the duplication processing apparatus 100 may include the log collection server 180).

The job log 185 stores job history information of each information processing apparatus 140 (processing history information of each information processing apparatus 140). Examples of the job history information include date and time when a printing process is performed, a user who performs the printing operation, and data which is a target of the printing process.

The UI operation log 190 stores user interface history information of each information processing apparatus 140. Examples of the user interface history information include date and time when the setting input UI module 165 is processed, a user who performs the operation, and contents of the operation.

The installation log 195 stores installation history information of each information processing apparatus 140. Examples of the installation history information include date and time when the information processing apparatus 140 is installed, a user who installs the information processing apparatus 140, and contents of the installation (a place, an IP address, a person in charge and the like).

Figure 2:
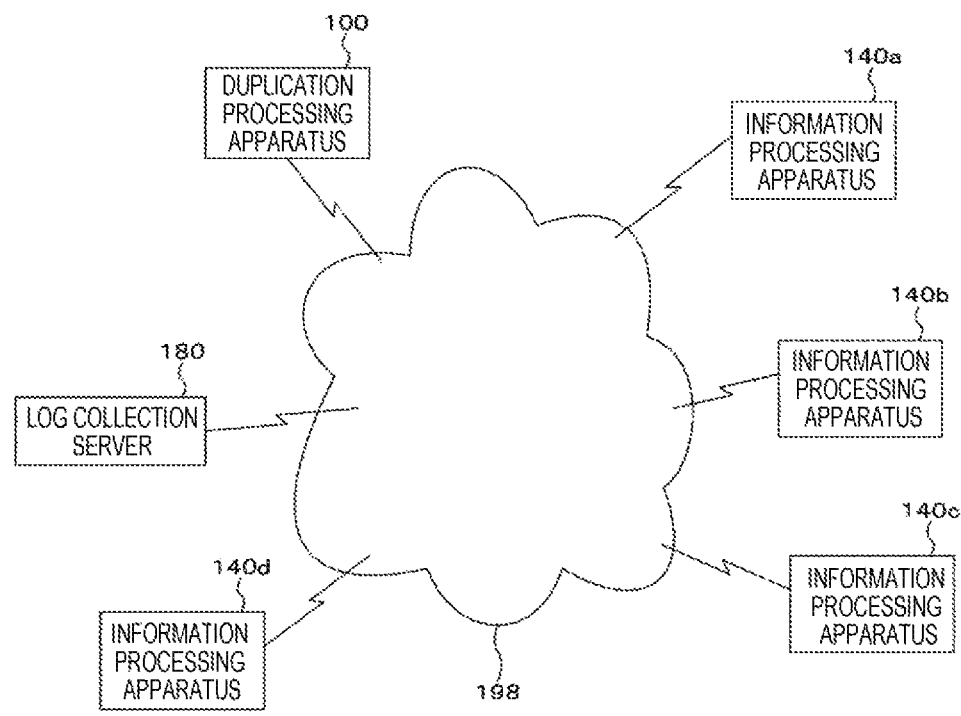
FIG. 2 is an explanatory view illustrating a system configuration example using the exemplary embodiment.

FIG. 2 is an explanatory view illustrating a system configuration example using the present exemplary embodiment.

The duplication processing apparatus 100, the information processing apparatus 140a, the information processing apparatus 140b, the information processing apparatus 140c, the information processing apparatus 140d, and the log collection server 180 are connected to each other via the communication line 198. The communication line 198 may be wireless, wired, a combination of these, or may be, for example, the Internet, an intranet, or the like as a communication infrastructure. Further, the functions of the duplication processing apparatus 100 and the log collection server 180 may be implemented as a cloud service for the information processing apparatus 140.

In addition, a communication among the duplication processing apparatus 100, the information processing apparatus 140a as the first information processing apparatus, the information processing apparatus 140b as the second information processing apparatus (the information processing apparatus 140 other than the information processing apparatus 140a), and the like may require a process such as firewall traversal.

For example, when installing a new application in the information processing apparatus 140a (an example of a case where the configuration is changed), the information processing apparatus 140a detects an event of the installation and issues a duplication request to the duplication processing apparatus 100. The duplication processing apparatus 100 selects an information processing apparatus 140 having a similar configuration and setting to the configuration and setting of the information processing apparatus 140a based on the configuration and setting of the information processing apparatus 140a (specifically, selects the information processing apparatus 140b in which the application is already installed, or the like), and transmits the setting information of the application to the information processing apparatus 140a. The information processing apparatus 140a receives the setting information and makes a setting so that the application can be executed.

Figure 3:
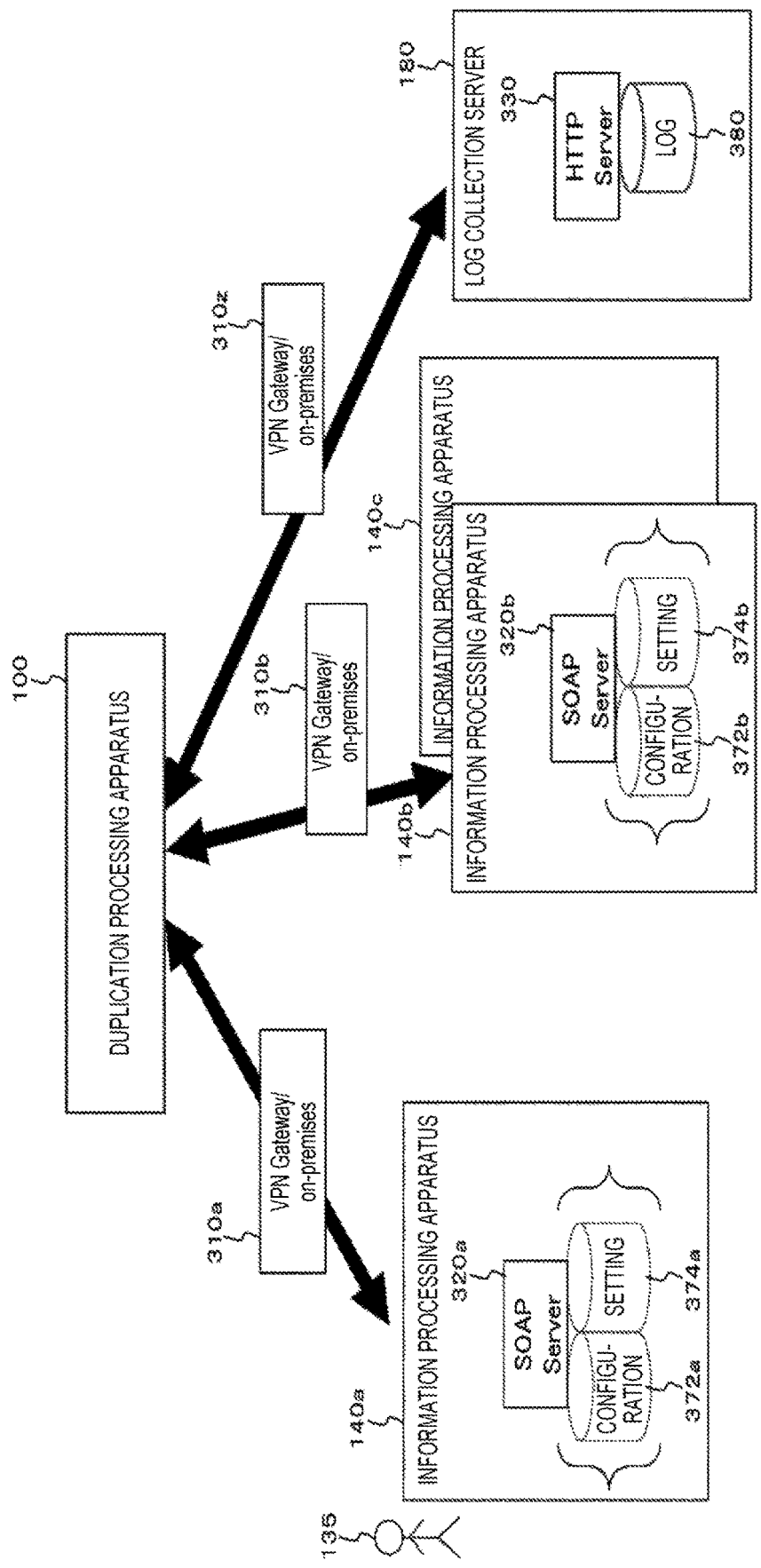
FIG. 3 is an explanatory view illustrating a specific system configuration example using the exemplary embodiment.

FIG. 3 is an explanatory view illustrating a specific system configuration example using the present exemplary embodiment.

The duplication processing apparatus 100 is connected to the information processing apparatus 140a, the information processing apparatus 140b, the information processing apparatus 140c, and the log collection server 180 via a VPN-Gateway/on-premises 310 serving as a firewall. The duplication processing apparatus 100 acquires (gets) configuration information 372, setting information 374, and log information 380 or transmits (sets) the setting information or the like. For example, a communication is performed using a secure sockets layer virtual private network (SSL-VPN)/security architecture for Internet protocol (Ipsec), or the like.

In this example, when the duplication processing apparatus 100 communicates with another apparatus (the information processing apparatus 140, the log collection server 180), the duplication processing apparatus 100 may be connected to the communication line 198 via the VPNGateway/on-premises. A VPNGateway is a virtual network gateway that transmits encrypted traffic to on-premise location (in-house or the like) via a public connection.

The information processing apparatus 140 includes a SOAPServer 320, the configuration information 372, and the setting information 374. Also, the configuration information 372 and the setting information 374 are transmitted to the duplication processing apparatus 100 using the SOAPServer 320.

The log collection server 180 includes an HTTPServer 330 and the log information 380. Then, the log information 380 is transmitted to the duplication processing apparatus 100 using the HTTPServer 330.

In the present exemplary embodiment, the storage locations of the configuration information 372, the setting information 374, and the log information 380 are not limited. It should be noted that FIG. 3 illustrates a specific example. For example, a configuration table 400 is provided as the configuration information 372. For example, a setting information table 500 is provided as the setting information 374. For example, a log information table 600 is provided as the log information 380.

Figure 4:
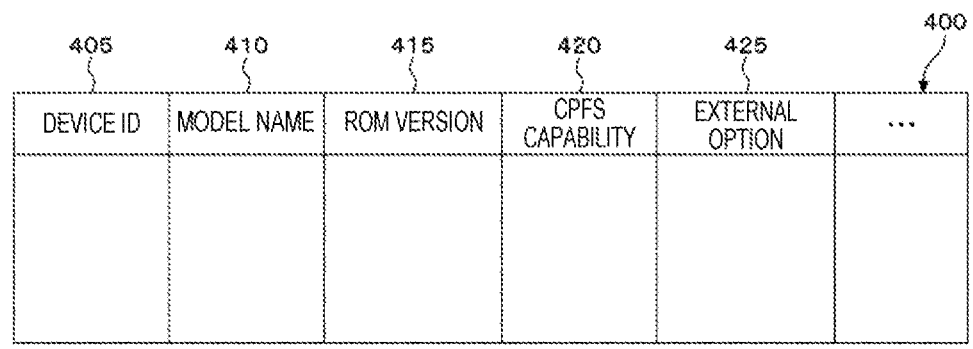
FIG. 4 is an explanatory view illustrating an example of a data structure of a configuration table.

FIG. 4 is an explanatory view illustrating an example of a data structure of the configuration table 400.

The configuration table 400 includes a device ID column 405, a model name column 410, a ROM version column 415, a CPFS capability column 420, and an external option column 425. The device ID column 405 stores information that uniquely identifies the information processing apparatus 140 (device ID: IDentification) in the present exemplary embodiment. The model name column 410 stores a model name of the device (or a product name of the device). The ROM version column 415 stores a ROM version of the device. The CPFS capability column 420 stores CPFS capabilities of the device (Copy, Print, Facsimile, and image read (Scan)). For example, the CPFS capability column 420 indicates which of the CPFS capabilities the device has. The external option column 425 stores an external option of the device (hardware option). For example, as described above, the external option column 425 indicates a finisher, an IC card reader, or the like of the device.

Figure 5:
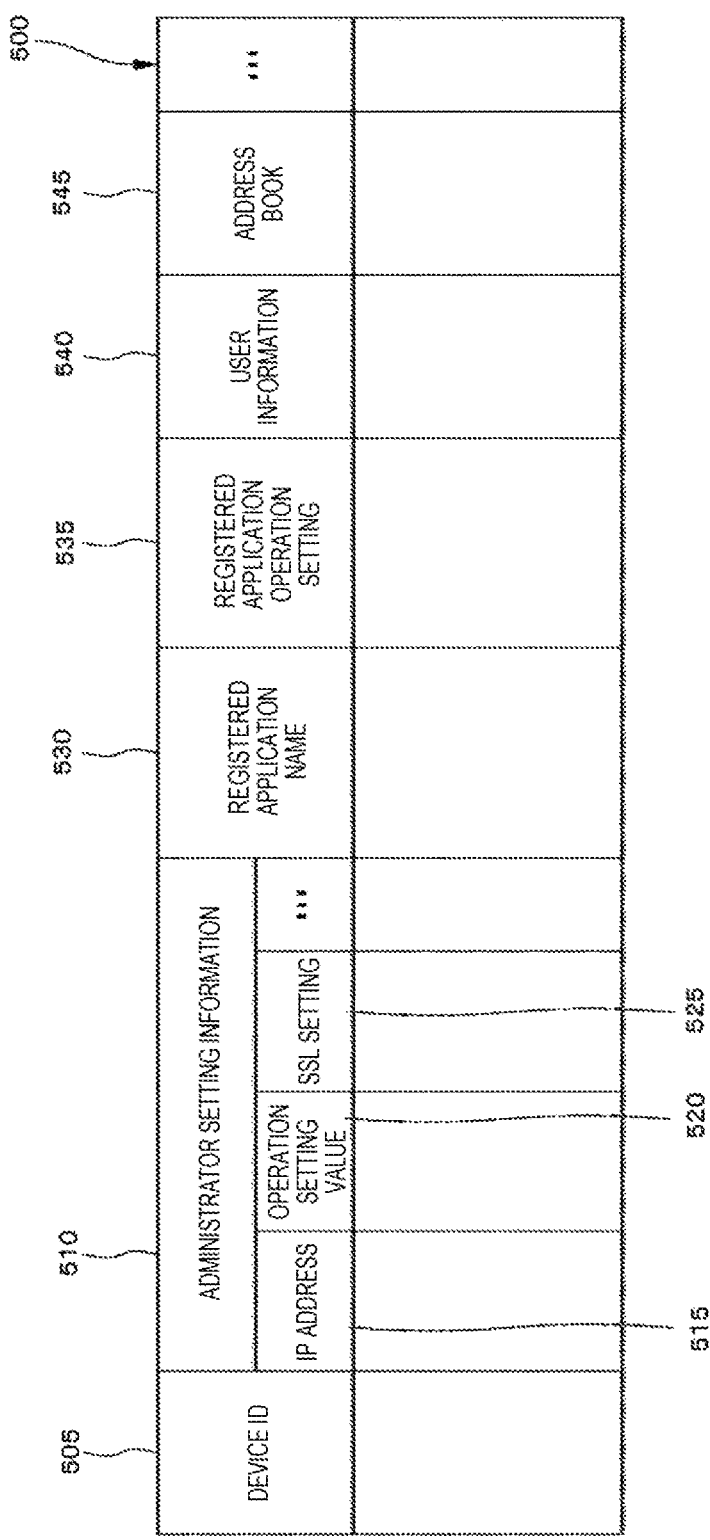
FIG. 5 is an explanatory view illustrating an example of a data structure of a setting information table.

FIG. 5 is an explanatory view illustrating an example of a data structure of the setting information table 500.

The setting information table 500 includes a device ID column 505, an administrator setting information column 510, a registered application name column 530, a registered application operation setting column 535, a user information column 540, an address book column 545, and the like. The device ID column 505 stores the device ID. The administrator setting information column 510 stores information set by an administrator. Specifically, the administrator setting information column 510 includes an IP address column 515, an operation setting value column 520, and an SSL setting column 525. The IP address column 515 stores an IP address of the device. The operation setting value column 520 stores an operation setting value of the device. The SSL setting column 525 stores a SSL setting of the device. The registered application name column 530 stores an application name registered in the device. The registered application operation setting column 535 stores an operation setting of the application. The user information column 540 stores user information that is a person in charge of the device. The address book column 545 stores an address book of the device (for example, a FAX transmission destination, an e-mail address, and the like).

FIG. 6 is an explanatory view illustrating an example of a data structure of the log information table 600. The log information table 600 is a combination of the job log 185, the UI operation log 190, and the installation log 195.

The log information table 600 includes a log ID column 605, a log type column 610, a date and time column 615, an operator column 620, an operation contents column 625, and the like. The log ID column 605 stores information that uniquely identifies a log (log ID) in the present exemplary embodiment. The log type column 610 stores a type of log (for example, job history, user interface history, and installation history). The date and time column 615 stores date and time when the log is generated. The operator column 620 stores an operator who has performed the log (for example operation) (user information). The operation contents column 625 stores operation contents.

Figure 7:
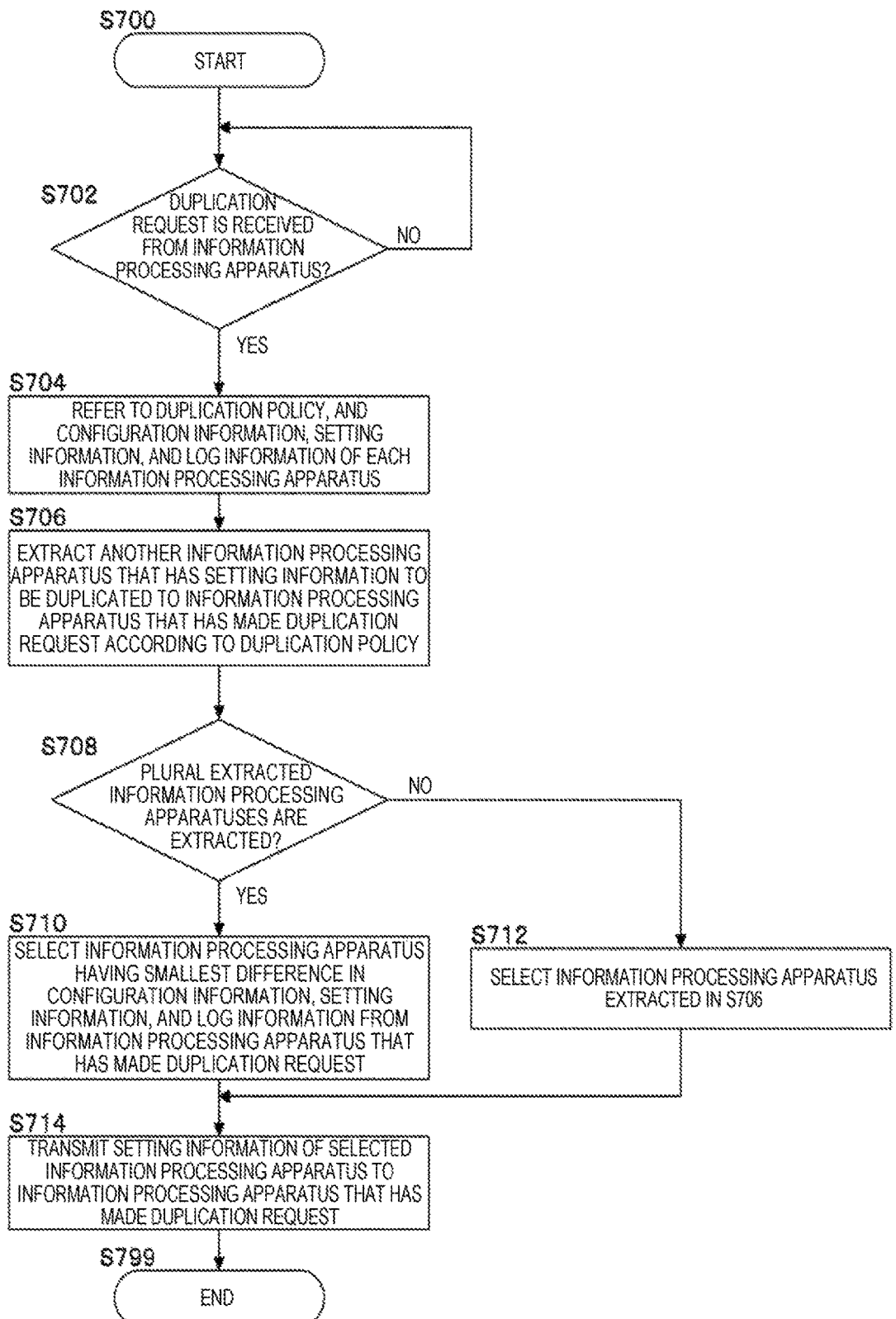
FIG. 7 is a flowchart illustrating a processing example according to the exemplary embodiment.

FIG. 7 is a flowchart illustrating a processing example according to the present exemplary embodiment. This is a process performed mainly by the setting duplication control module 130 or a process performed by controlling another module by the setting duplication control module 130.

In step S702, the setting duplication request reception module 110 determines whether a duplication request has been received from the information processing apparatus 140. When the duplication request has been received, the process proceeds to step S704. Otherwise, the process waits until the duplication request has been received.

In step S704, the function utilization performance comparison module 125 refers to a duplication policy, and the configuration information, the setting information, and the log information of each information processing apparatus 140. Here, when there are plural duplication policies, the priorities of the duplication policies (application order) are defined. When an information processing apparatus 140 having a higher priority cannot be selected, the next priority may be applied. For example, a higher priority may be set under the condition that all of the configuration information, setting information, and log information match (including a case where differences are within a predetermined range), and the next priority may be set under the condition that the configuration information and the setting information match.

In step S706, the function utilization performance comparison module 125 extracts another information processing apparatus 140 that has the setting information to be duplicated to the information processing apparatus 140 that has made the duplication request, in accordance with the duplication policy.

In step S708, the setting duplication control module 130 determines whether plural information processing apparatuses 140 are extracted in step S706. When it is determined that the plural information processing apparatuses 140 are extracted, the process proceeds to step S710. Otherwise, the process proceeds to step S712.

In step S710, the setting duplication control module 130 selects the information processing apparatus 140 having the smallest difference in the configuration information, the setting information, and the log information from the information processing apparatus 140 that has made the duplication request.

In step S712, the setting duplication control module 130 selects the information processing apparatus 140 extracted in step S706.

In step S714, the duplication information transmission module 115 transmits the setting information of the selected information processing apparatus 140 to the information processing apparatus 140 that has made the duplication request.

Hereinafter, descriptions will be made using specific examples illustrated in FIGS. 8 to 14.

Figure 8:
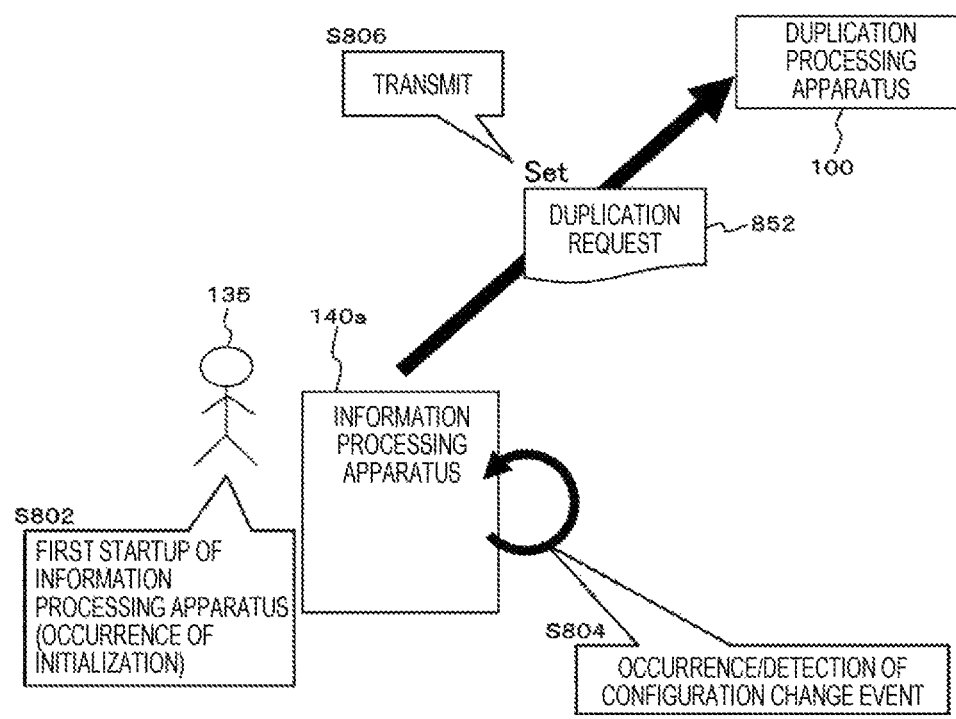
FIG. 8 is an explanatory view illustrating a processing example according to the exemplary embodiment.

FIG. 8 is an explanatory view illustrating a processing example according to the present exemplary embodiment.

In step S802, the user 135 performs a first startup (or initialization) for the information processing apparatus 140a.

In step S804, a configuration change event occurs, and the configuration change control module 160 detects the occurrence of the configuration change.

In step S806, the duplication request module 150 of the information processing apparatus 140a transmits a duplication request 852 to the duplication processing apparatus 100.

Figure 9:
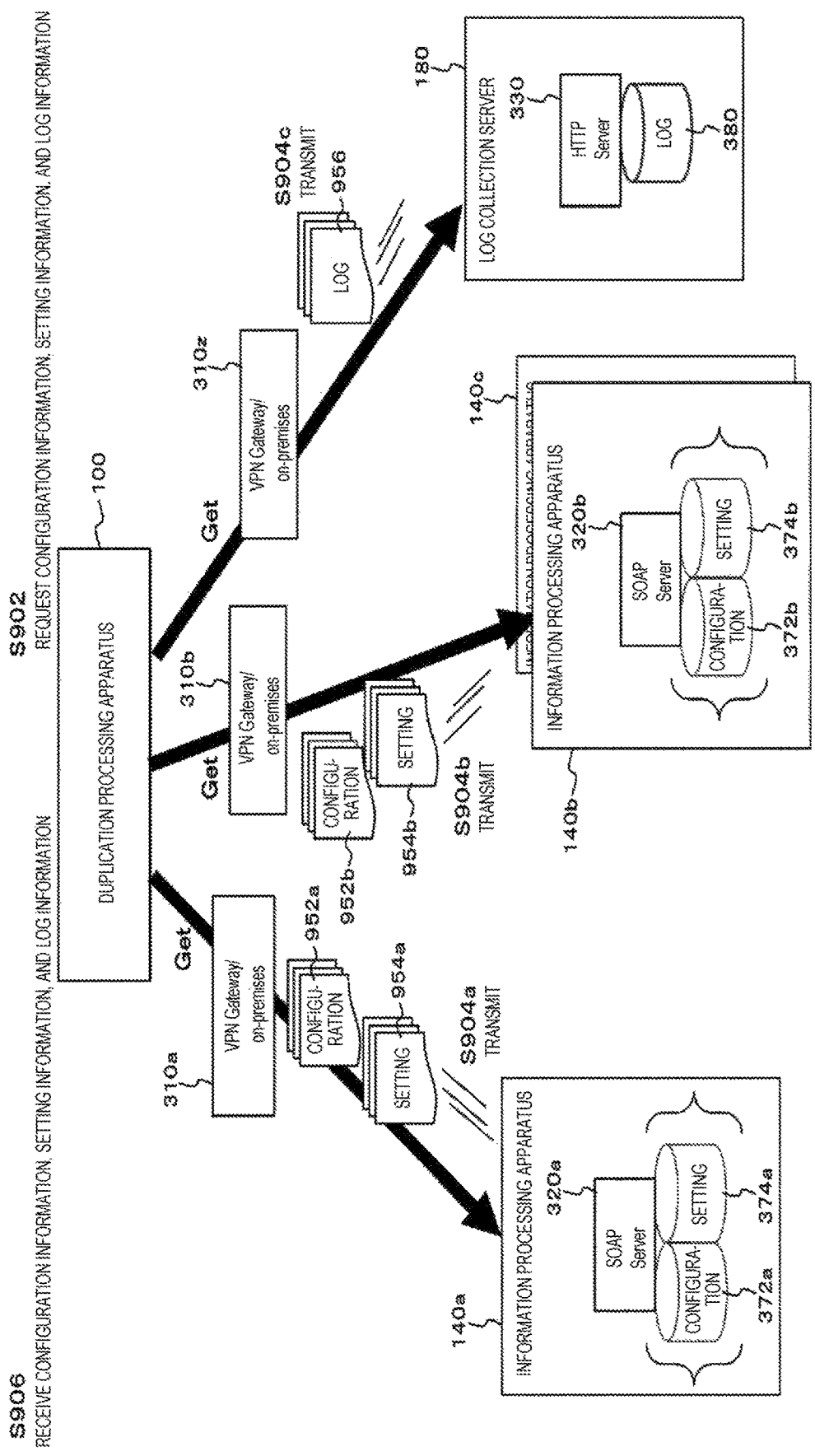
FIG. 9 is an explanatory view illustrating a processing example according to the exemplary embodiment.

FIG. 9 is an explanatory view illustrating a processing example according to the present exemplary embodiment.

In step S902, the function utilization performance comparison module 125 (configuration/setting/log/reference module 120) of the duplication processing apparatus 100 requests the configuration information and the setting information from each information processing apparatus 140, and requests the log information from the log collection server 180. For example, the function utilization performance comparison module 125 (configuration/setting/log/reference module 120) of the duplication processing apparatus 100 requests each information processing apparatus 140 (a counterpart such as on-premises)) by a dedicated interface through a dedicated line and receives from the counterpart's service (information processing apparatus 140). Then, the function utilization performance comparison module 125 (configuration/setting/log/reference module 120) of the duplication processing apparatus 100 requests the log of each information processing apparatus 140 from the log collection server 180 and receives the log of each information processing apparatus 140 from the counterpart (log collection server 180).

In step S904a, the information processing apparatus 140a transmits configuration information 952a and setting information 954a to the configuration/setting/log/reference module 120 of the duplication processing apparatus 100 via a VPNGateway/on-premises 310a.

In step S904b, the information processing apparatus 140b and the like transmit configuration information 952b and setting information 954b to the configuration/setting/log/reference module 120 of the duplication processing apparatus 100 via a VPNGateway/on-premises 310b.

In step S904c, the log collection server 180 transmits a log 956 to the configuration/setting/log/reference module 120 of the duplication processing apparatus 100 via a VPNGateway/on-premises 310z.

In step S906, the function utilization performance comparison module 125 (configuration/setting/log/reference module 120) of the duplication processing apparatus 100 receives the configuration information 952 and the setting information 954 from each information processing apparatus 140, and receives the log 956 from the log collection server 180.

Further, the duplication processing apparatus 100 may manage (store) the configuration information, the setting information, and the log information of each information processing apparatus 140 in a synchronous manner. That is, the present exemplary embodiment may be implemented in an environment in which it is not necessary to acquire such various types of information.

The function utilization performance comparison module 125 of the duplication processing apparatus 100 extracts information to be transmitted to the information processing apparatus 140a that has made the duplication request, by using, for example, a configuration/setting/log information table 1000. Here, it is assumed that the duplication policy is defined so that the information processing apparatus 140 having the configuration, setting, and log most similar to the information processing apparatus 140a that has made the duplication request is selected.

FIG. 10 is an explanatory view illustrating an example of a data structure of the configuration/setting/log information table 1000. The configuration/setting/log information table 1000 includes a target information processing apparatus column 1005, a configuration information column 1010, a setting information column 1025, and a log information column 1045.

The target information processing apparatus column 1005 stores a target information processing apparatus (device ID). The configuration information column 1010 includes a model name column 1015 and a CPFS capability (including options) column 1020. The configuration information column 1010 stores information on the configuration of the information processing apparatus. The model name column 1015 stores a model name of the information processing apparatus. The CPFS capability (including options) column 1020 stores the CPFS capability (including options) of the information processing apparatus. The setting information column 1025 includes an add-on application presence/absence column 1030. The setting information column 1025 stores the setting information of the information processing apparatus. The add-on application presence/absence column 1030 includes a ScanAuto column 1035 and a PrivatePrint column 1040. The add-on application presence/absence column 1030 stores presence or absence of an add-on application in the information processing apparatus. The ScanAuto column 1035 stores information indicating whether ScanAuto, which is an add-on application, is installed (whether ScanAuto is present) in the information processing apparatus. The PrivatePrint column 1040 stores information indicating whether PrivatePrint, which is an add-on application, is installed (whether PrivatePrint is present) in the information processing apparatus. The log information column 1045 includes a job log column 1050 or the like. The log information column 1045 stores various types of log information in the device. The job log column 1050 has a number of job execution column 1055. The job log column 1050 stores a job log in the information processing apparatus. The number of job execution column 1055 includes a scan column 1060 and a print column 1065. The number of job execution column 1055 stores the number of times each job is executed on the information processing apparatus. The scan column 1060 stores the number of times scanning is executed on the information processing apparatus. It is noted that the scanning is an example of the job. The print column 1065 stores the number of times printing is executed on the information processing apparatus. It is noted that the printing is another example of the job.

With regard to the configuration information, the setting information, and the log information of each information processing apparatus 140, one information processing apparatus 140 having a high degree of coincidence with the information processing apparatus 140a that has made the duplication request is selected. Then, the setting of the selected information processing apparatus 140 is extracted.

For example, when the information processing apparatus 140a that has made the duplication request is a "device X (the first row of the configuration/setting/log information table 1000)", another device B 1070 (the third row of the configuration/setting/log information table 1000) matches the device X in the model name column 1015 and the CPFS capability (including options) column 1020. In addition, the other device B 1070 matches the device X in the add-on application presence/absence column 1030 (the ScanAuto column 1035 and the PrivatePrint column 1040). Therefore, the other device B 1070 (the third row of the configuration/setting/log information table 1000) is determined to be suitable as a device possessing a pre-cloning setting for the "device A", and thus selected. In addition, with respect to the configuration information, the setting information, and the log information, a weight may be added to calculate the degree of coincidence. For example, the configuration information and the setting information may be weighted heavier than the log information. When the information processing apparatus 140a that has made the duplication request is started for the first time (specifically, when a value in the log information column 1045 is less than or equal to a predetermined threshold value), the weight of the log information may be set to 0 (that is, a selection is made using only the configuration information and the setting information). When the use frequency of a predetermined configuration is small (a value of the log information is small), a setting of the predetermined configuration may not to be extracted. Specifically, in a case where a setting of the printing configuration is made, when the number of times of use of printing on an information processing apparatus 140 having a high degree of coincidence is less than or equal to the predetermined threshold value, that information processing apparatus 140 may not be adopted and an information processing apparatus 140 having a secondly higher degree of coincidence may be selected.

Figure 11:
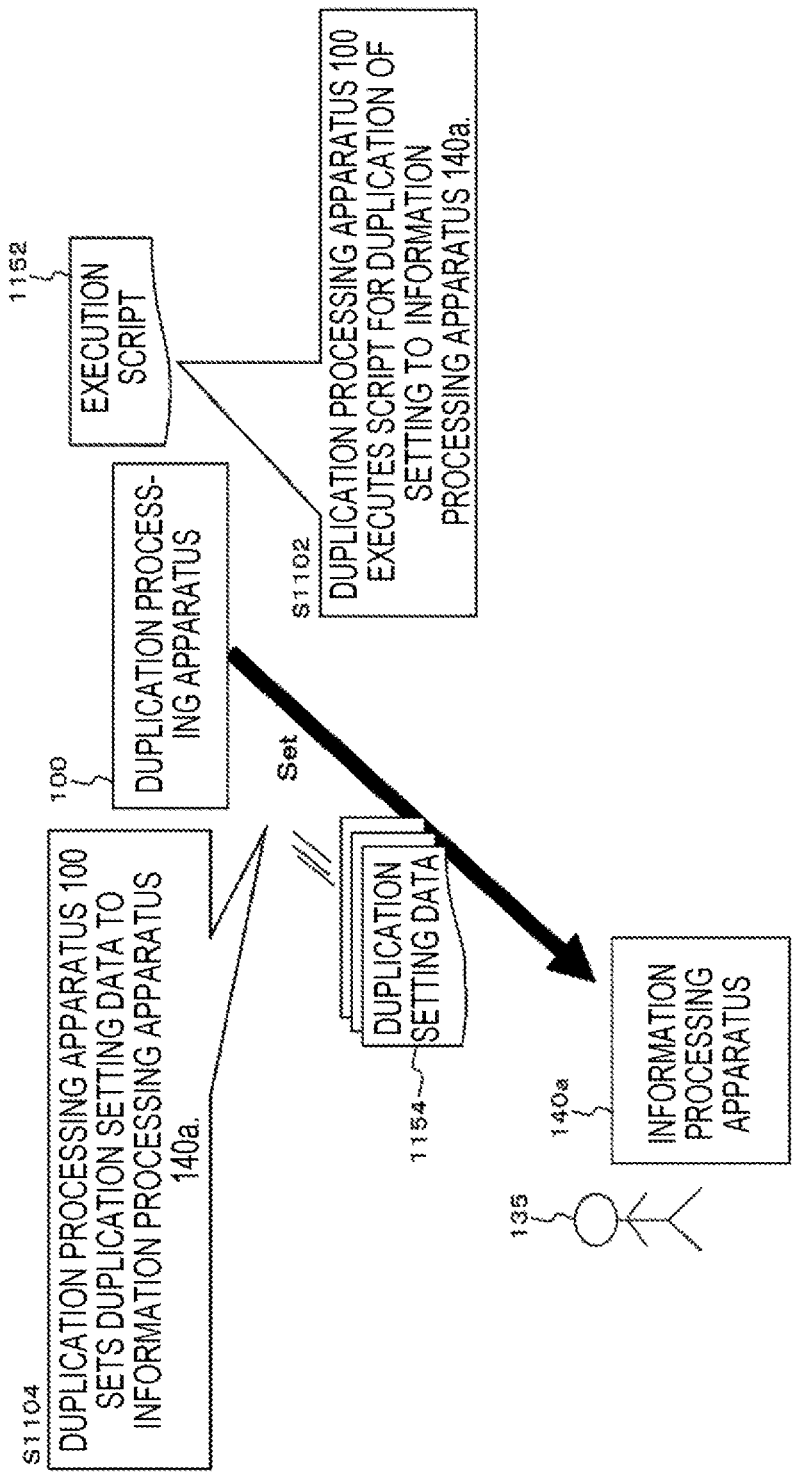
FIG. 11 is an explanatory view illustrating a processing example according to the exemplary embodiment.

FIG. 11 is an explanatory view illustrating a processing example according to the present exemplary embodiment. This view illustrates an example of a push type duplicating process.

The other device B 1070 is selected based on the configuration/setting/log information table 1000 illustrated in the example of FIG. 10, and a setting of the other device B 1070 is extracted. Then, an execution script 1152 that performs a cloning process is generated. A unit that implements the execution script 1152 is not particularly limited, and may be, for example, a CGI, an execution program, a Web API module, or the like.

In step S1102, the duplication processing apparatus 100 executes the execution script 1152 for duplication of a setting to the information processing apparatus 140a.

The execution script 1152 is executed based on the following information.
  Address of the information processing apparatus 140a
  An exclusion process to the information processing apparatus 140a
  Establishment of asynchronous communication control to the information processing apparatus 140a Here, the "exclusion process" may block access from users or other programs by locking the user interface during duplication. In addition, functions irrelevant to the setting to be duplicated may be made available. For example, in the case of making a printing setting, the exclusion process makes the printing function unavailable, but makes the scanner function available.

In step S1104, the duplication processing apparatus 100 transmits (sets) duplication setting data 1154 to the information processing apparatus 140a.

Figure 12:
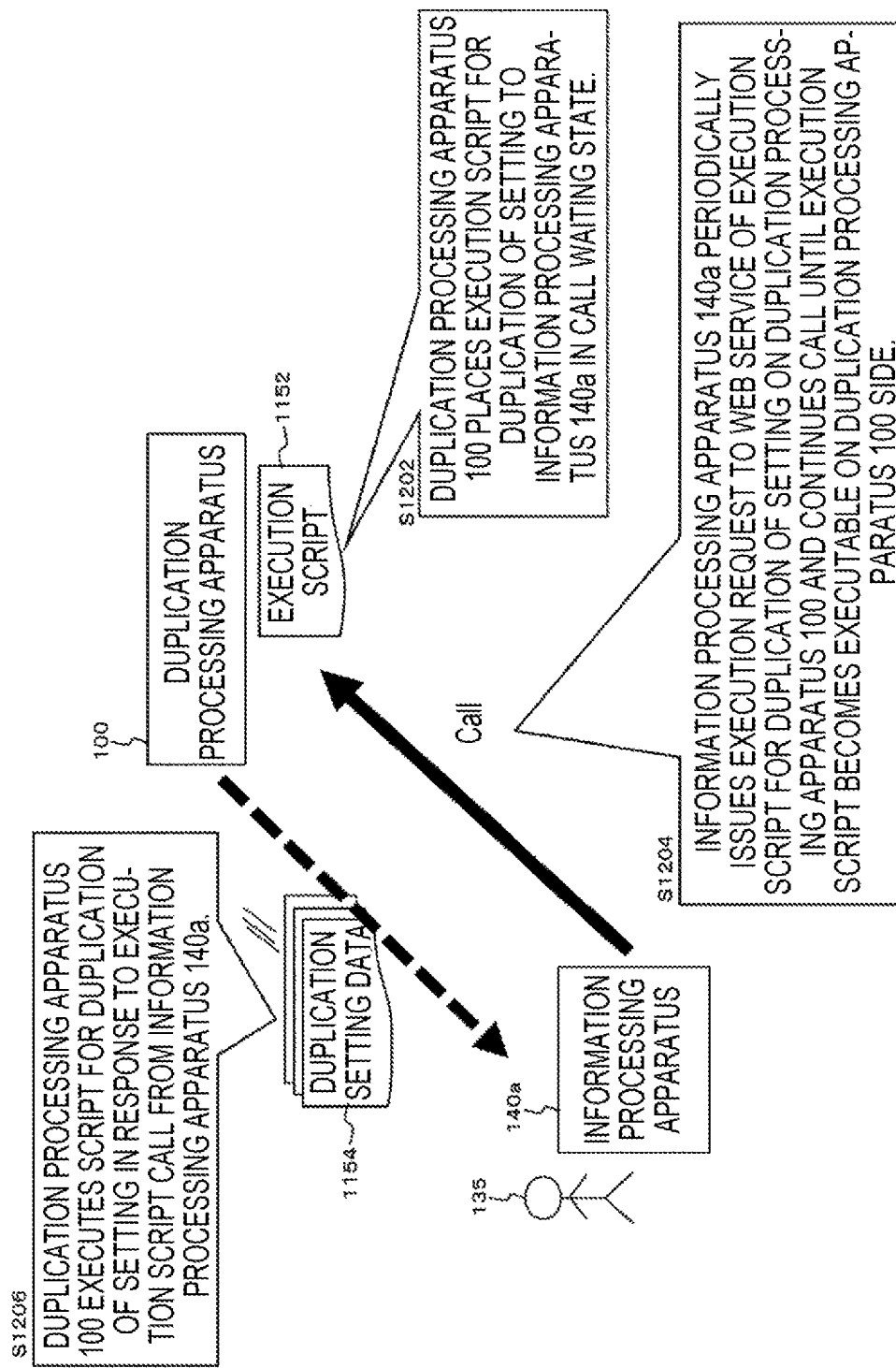
FIG. 12 is an explanatory view illustrating a processing example according to the exemplary embodiment.

FIG. 12 is an explanatory view illustrating a processing example according to the present exemplary embodiment. This view illustrates an example of a pull-type (call) duplication process.

The other device B 1070 is selected based on the configuration/setting/log information table 1000 illustrated in the example of FIG. 10, and a setting of the other device B 1070 is extracted. Then, an execution script 1152 that performs a cloning process is generated. A unit that implements the execution script 1152 is not particularly limited, and may be, for example, a CGI, an execution program, a Web API module, or the like.

In step S1202, the duplication processing apparatus 100 places the execution script 1152 for duplication of a setting to the information processing apparatus 140a in a call waiting state.

In step S1204, the information processing apparatus 140a periodically issues an execution request (Request) to a Web service of the execution script 1152 for duplication of a setting on the duplication processing apparatus 100. The information processing apparatus 140a continues call until the execution script 1152 becomes executable on the duplication processing apparatus 100 side.

In step S1206, the duplication processing apparatus 100 executes a script for duplication of a setting, in response to an execution script call from the information processing apparatus 140a. That is, the duplication processing apparatus 100 transmits (sets) the duplication setting data 1154 to the information processing apparatus 140a.

Figure 13:
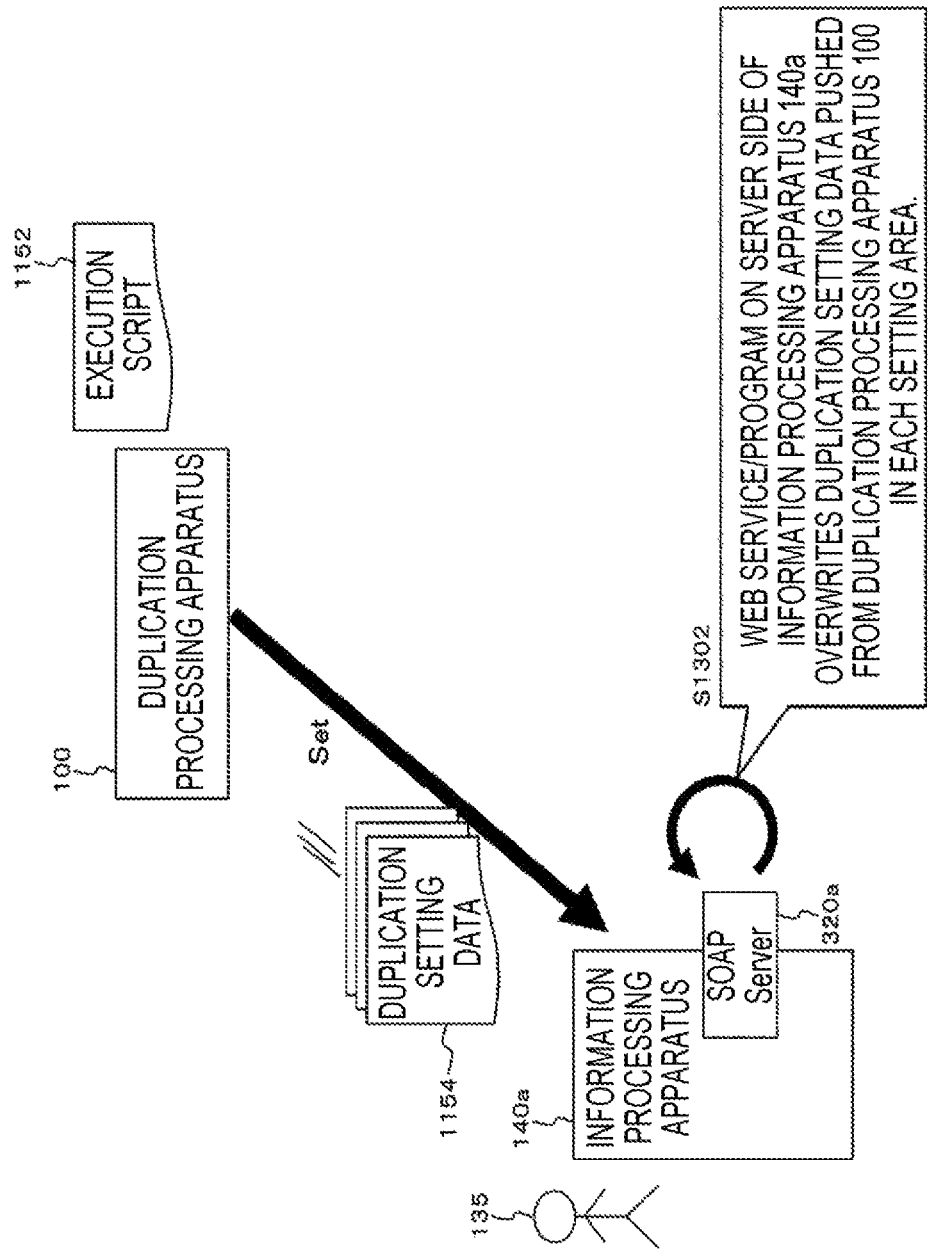
FIG. 13 is an explanatory view illustrating a processing example according to the exemplary embodiment.

FIG. 13 is an explanatory view illustrating a processing example according to the present exemplary embodiment. The information processing apparatus 140a that has made the duplication request duplicates the setting to the own information processing apparatus 140a in accordance with a request during execution of the execution script 1152 from the duplication processing apparatus 100.

In step S1302, the SOAPServer 320a of the information processing apparatus 140a (Web service/program on the server side) overwrites the duplication setting data 1154 transmitted from the duplication processing apparatus 100 in each setting area.

When a setting not suitable for duplication (settings that are not duplicated) exists in step S1302, a user interface for input of a setting is displayed on a display device of the information processing apparatus 140a with respect to these settings. Here, as described above, examples of the "settings not suitable for duplication" include the setting of the confidential box, the output setting of a full color machine in the case where the information processing apparatus requesting duplication is a black and white machine, the setting of an IP address, the setting of a domain name, and an administrator account. Whether the setting is "not suitable for duplication" may be determined based on whether the setting is a predetermined setting (one of a setting that can be duplicated or a setting that cannot be duplicated). Alternatively, when it is attempted to make a setting but there is no corresponding setting, the setting may be determined to be the "settings not suitable for duplication."

Figure 14:
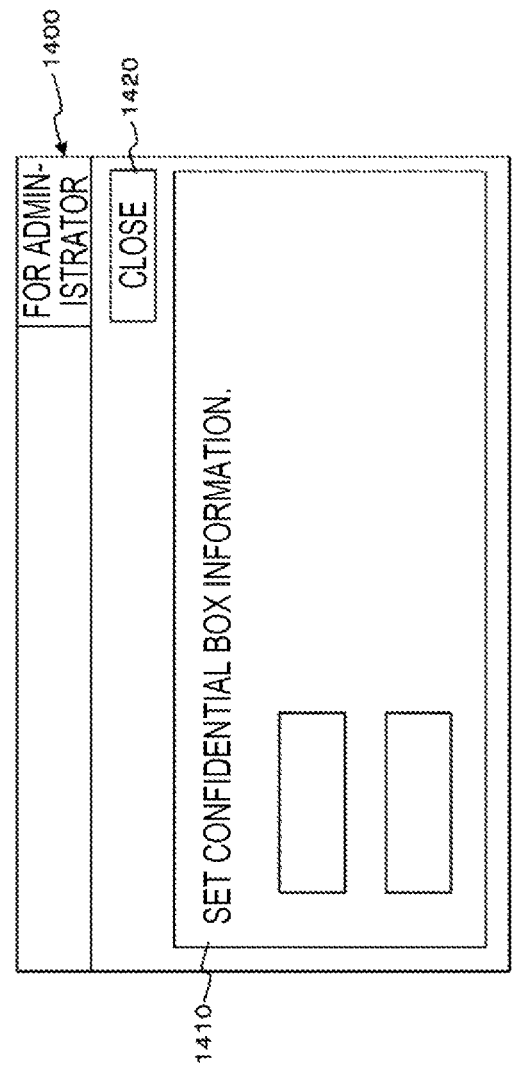
FIG. 14 is an explanatory view illustrating a presentation example of a screen.

For example, a screen 1400 is displayed on the display device of the information processing apparatus 140a. FIG. 14 is an explanatory view illustrating a presentation example of the screen 1400.

A confidential box information setting area 1410 and a close button 1420 are displayed on the screen 1400. In the confidential box information setting area 1410, for example, "Set confidential box information" is displayed. Since setting the confidential box by duplication is a "setting not suitable for duplication", the setting screen of the confidential box is displayed. Then, a user of the information processing apparatus 140a (person in charge of maintenance) sets the confidential box of the information processing apparatus 140a. In addition, help information related to the setting (explanation, advice, etc. related to the setting) may be presented.

Figure 15:
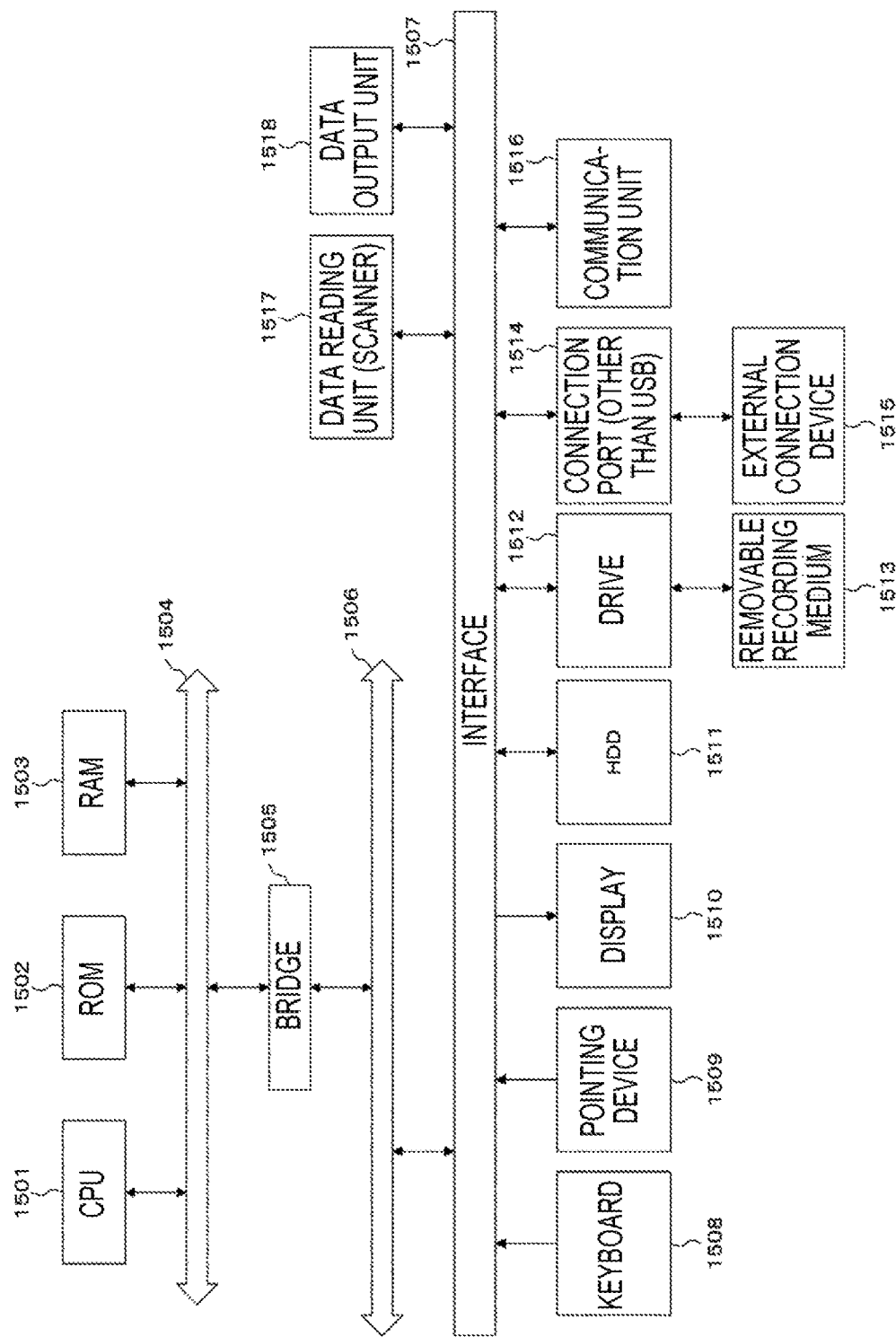
FIG. 15 is a block diagram illustrating an example of a hardware configuration of a computer that implements the exemplary embodiment.

An example of a hardware configuration of the duplication processing apparatus 100, the information processing apparatus 140, and the log collection server 180 according to the present exemplary embodiment will be described with reference to FIG. 15. The configuration illustrated in FIG. 15 is implemented by, for example, a personal computer (PC) or the like. FIG. 15 illustrates an example of a hardware configuration including a data reading unit 1517 such as a scanner and a data output unit 1518 such as a printer.

A central processing unit (CPU) 1501 is a controller that executes processing according to a computer program that describes execution sequences of various modules in the exemplary embodiment as explained above, that is, the reception/transmission module 105, the setting duplication request reception module 110, the duplication information transmission module 115, the configuration/setting/log/reference module 120, the function utilization performance comparison module 125, the setting duplication control module 130, the reception/transmission module 145, the duplication request module 150, the duplication processing module 155, the configuration change control module 160, the setting input UI module 165, etc.

A read only memory (ROM) 1502 stores programs, operation parameters, and the like used by the CPU 1501. A random access memory (RAM) 1503 stores programs to be used in the execution of the CPU 1501, parameters appropriately changing in the execution thereof, and the like. These components are mutually connected by a host bus 1504 configured with a CPU bus or the like.

The host bus 1504 is connected to an external bus 1506 such as a peripheral component interconnect/interface (PCI) bus via a bridge 1505.

A keyboard 1508 and a pointing device 1509 such as a mouse are devices operated by an operator. A display 1510 includes a liquid crystal display device, a cathode ray tube (CRT), or the like, and displays various information as text or image information. Further, a touch screen or the like having both functions of the pointing device 1509 and the display 1510 may be used. In that case, in order to implement the function of the keyboard, the keyboard (e.g., so-called a software keyboard, or a screen keyboard) may be drawn by software on the screen (touch screen) without physically connecting the keyboard as in the keyboard 1508.

A hard disk drive (HDD) 1511 incorporates a hard disk (which may be a flash memory or the like) and drives the hard disk to record or reproduce programs and information to be executed by the CPU 1501. The hard disk implements functions as the configuration/setting information storage module 170, the non-duplication setting storage module 175, the job log 185, the UI operation log 190, the installation log 195, and the like. Furthermore, for example, various other data and various computer programs are stored in the hard disk.

A drive 1512 reads out data or programs recorded on a removable recording medium 1513 mounted thereon, such as a magnetic disk, an optical disc, a magneto-optical disc, or a semiconductor memory, and supplies the data or programs to the RAM 1503 connected via an interface 1507, the external bus 1506, the bridge 1505, and the host bus 1504. The removable recording medium 1513 may also be used as a data recording area.

A connection port 1514 is a port that connects an external connection device 1515 and has a connection part such as a USB or an IEEE 1394. The connection port 1514 is connected to the CPU 1501 and the like via the interface 1507, the external bus 1506, the bridge 1505, the host bus 1504, and the like. A communication unit 1516 is connected to a communication line and executes a process of data communication with the outside. The data reading unit 1517 is, for example, a scanner, and executes a document reading process. The data output unit 1518 is, for example, a printer, and executes a document data outputting process.

The hardware configuration of the duplication processing apparatus 100, the information processing apparatus 140, and the log collection server 180 illustrated in FIG. 15 represents one configuration example. The present exemplary embodiment is not limited to the configuration illustrated in FIG. 15, and may be used to implement the modules described in the present exemplary embodiment. For example, some of the modules may be configured with dedicated hardware (e.g., an application specific integrated circuit (ASIC), etc.), some of the modules may be in an external system and may be connected via a communication line. Further, plural systems illustrated in FIG. 15 may be interconnected via a communication line so as to operate in cooperation. Particularly, in addition to a personal computer, the modules may be incorporated in a portable information communication device (e.g., including a mobile phone, a smartphone, a mobile device, or a wearable computer), an information home appliance, a robot, a copier, a facsimile, a scanner, a printer, a multifunction machine (e.g., an image processing apparatus having at least two functions of a scanner, a printer, and a facsimile).

The program described above may be stored in a recording medium or may be provided by a communication unit. In that case, for example, the program described above may be grasped as an invention of "a computer-readable recording medium storing a program".

The "computer-readable recording medium storing a program" refers to a computer-readable recording medium in which a program is recorded and which is used for installation, execution, distribution and so on of programs.

Examples of the recording medium may include a digital versatile disc (DVD) such as "DVD-R, DVD-RW, DVD-RAM, etc." which are standards formulated by the DVD forum, "DVD+R, DVD+RW, etc." which are standards formulated by the DVD+RW, a compact disc (CD) such as a read only memory (CD-ROM), a CD recordable (CD-R), and a CD rewritable (CD-RW), a Blu-ray (registered trademark) disc, a magneto-optical disc (MO), a flexible disc (FD), a magnetic tape, a hard disk, a read only memory (ROM), an electrically erasable and rewritable read only memory (EEPROM (registered trademark)), a flash memory, a random access memory (RAM), a secure digital (SD) memory card, and the like.

The entire or a portion of the above-described program may be recorded in the recording medium for storage, distribution, and the like. Further, the whole or part of the above-described program may be transmitted by communications using transmission media such as a wired network, a wireless communication network or a combination thereof used for a local area network (LAN), a metropolitan area network (MAN), a wide area network (WAN), the Internet, an intranet, an extranet, and the like, or may be carried on a carrier wave.

Further, the above-described program may be a portion or the whole of another program, or may be recorded on a recording medium together with a separate program. Further, the above-described program may be divided and recorded in plural recording media. Further, the above-described program may be recorded in any restorable manner as long as it may be compressed or coded. The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A duplication processing apparatus comprising:
a first processor programed to, in response to receiving a setting duplication request from a first external information processing apparatus including a second processor,
automatically select a second external information processing apparatus including a third processor as a duplication source from a plurality of external information processing apparatuses different from the first external information processing apparatus based on a predetermined selection condition,
extract a setting to be duplicated from the selected second external information processing apparatus to the first external information processing apparatus based on a configuration and a setting of the first external information processing apparatus and a configuration and the setting of the selected second external information processing apparatus, and
transmit the extracted setting to the first external information processing apparatus, wherein
the predetermined selection condition includes a setting not to be duplicated.

2. The duplication processing apparatus according to claim 1, wherein the predetermined selection condition includes a condition that the second external information processing apparatus has the configuration, the setting, and history which are similar to the configuration, the setting, and history of the first external information processing apparatus, respectively.

3. The duplication processing apparatus according to claim 1, wherein
the predetermined selection condition includes a priority, and
the processor extracts the setting in accordance with the priority.

4. The duplication processing apparatus according to claim 3, wherein when the processor cannot extract the setting in accordance with the priority, the processor extracts a setting in accordance with a next priority.

5. The duplication processing apparatus according to claim 1, wherein when the processor cannot refer to at least one of the configuration, the setting, or history of the first external information processing apparatus, the processor excludes the at least one of the configuration, the setting, or the history of the first external information processing apparatus and selects the second external information processing apparatus which is the duplication source.

6. The duplication processing apparatus according to claim 1, wherein the processor extracts a predetermined setting as the setting to be duplicated to the first external information processing apparatus.

7. The duplication processing apparatus according to claim 2, wherein the processor refers to the history of the second external information processing apparatus, and when a use frequency of a predetermined configuration is small, the processor does not extract a setting of the predetermined configuration from the second external information processing apparatus.

8. A duplication processing system comprising:
   a duplication processing apparatus;
   a first information processing apparatus which is external to the duplication processing apparatus; and
   a second information processing apparatus which is different from the first information processing apparatus and external to the duplication processing apparatus, wherein
   the duplication processing apparatus includes
      a first processor programed to, in response to a setting duplication request from the first information processing apparatus,
         automatically select the second information processing apparatus as a duplication source from a plurality of information processing apparatuses different from the first information processing apparatus based on a predetermined selection condition,
         extract a setting to be duplicated from the selected second information processing apparatus to the first information processing apparatus based on a configuration and a setting of the first information processing apparatus and a configuration and the setting of the second information processing apparatus, and
         transmit the extracted setting to the first information processing apparatus,
   the first information processing apparatus is connected to the duplication processing apparatus via a communication line,
   the first information processing apparatus includes a second processor programed to, when an event for changing the configuration of the first information processing apparatus occurs,
      transmit the setting duplication request,
      receive the extracted setting from the duplication processing apparatus, and
      duplicate the setting to the first information processing apparatus; and
   the second information processing apparatus is connected to the duplication processing apparatus via the communication line, and
   the second information processing apparatus includes a third processor programed to transmit the configuration and the extracted setting of the second information processing apparatus.

9. The duplication processing system according to claim 8, wherein the second processor is further programed to, when a setting not suitable for duplication exists, notify a user of the setting not suitable for duplication.

10. A non-transitory computer readable medium storing a program that causes a computer including a first processor which is a duplication processing apparatus to execute a duplication process, the duplication process comprising:
   in response to a setting duplication request being received from a first external information processing apparatus including a second processor,
      automatically selecting a second external information processing apparatus including a third processor as a duplication source from a plurality of external information processing apparatuses different from the first external information processing apparatus based on a predetermined selection condition,
      extracting a setting to be duplicated from the selected second external information processing apparatus to the first external information processing apparatus based on a configuration and a setting of the first external information processing apparatus and a configuration and the setting of the selected second external information processing apparatus, and
      transmitting the extracted setting to the first external information processing apparatus, wherein
   the predetermined selection condition includes a setting not to be duplicated.

11. The duplication processing apparatus according to claim 1, wherein
   the setting duplication request is transmitted in response to the first external information processing apparatus detecting an event for changing the configuration of the first external information processing apparatus.

12. The duplication processing system according to claim 8, wherein
   the setting duplication request is transmitted in response to the first information processing apparatus detecting an event for changing the configuration of the first information processing apparatus.

13. The non-transitory computer readable medium according to claim 10, wherein
   the setting duplication request is transmitted in response to the first external information processing apparatus detecting an event for changing the configuration of the first external information processing apparatus.

* * * * *